United States Patent [19]

Schenck et al.

[11] Patent Number: 5,354,093
[45] Date of Patent: Oct. 11, 1994

[54] AIR BAG MODULE HAVING INTEGRAL COVER ATTACHMENT

[75] Inventors: David P. Schenck, Miamisburg; Robert E. Huffman, Tipp City; Jeffrey A. Shepherd, Fairborn, all of Ohio

[73] Assignee: General Motors Corporation, Detroit, Mich.

[21] Appl. No.: 41,594

[22] Filed: Apr. 5, 1993

[51] Int. Cl.$^5$ .............................................. B60R 21/16
[52] U.S. Cl. ................................................ 280/728 A
[58] Field of Search .......... 280/728 R, 728 A, 728 B, 280/730 R, 736, 741

[56] References Cited

U.S. PATENT DOCUMENTS 5,167,427  12/1992  Baba ............................... 280/728 B

FOREIGN PATENT DOCUMENTS 4205726   9/1992  Fed. Rep. of Germany ... 280/728 A
63-184545 7/1988  Japan ............................... 280/728 A
1-160757  6/1989  Japan ............................... 280/728 A Primary Examiner—Karin L. Tyson
Attorney, Agent, or Firm—Charles E. Leahy

[57] ABSTRACT

Two embodiments of an air bag module and method of assembly are disclosed. One air bag module includes a flat support plate and a cover confining an air bag. The cover confines the air bag and has a plurality of resilient latch hooks spaced about its periphery which snap over the edges of the support plate and engage adjacent latch surfaces. A locking plate has a locking tab located adjacent each latch hook when assembled to the support plate to prevent deflection of the latch hooks and maintain the latch hooks in engagement with the latch surfaces. The inflator is later secured to the support plate by rivets which also secure the air bag and locking plate to the support plate. Another air bag module includes an air bag, an inflator, an open rectangular retainer mounting the air bag, and an open top and bottom container receiving the retainer and mounting the inflator, and a cover. A plurality of resilient latch hooks on the cover snap over the walls of the retainer and into indentations formed on the periphery of the bottom of the retainer. The retainer is inserted into the top of the container and the camming flanges guide the latch hooks into engagement with the walls of the container which confine the latch hooks against deflection, thus securing the cover against separation. The inflator is later inserted into the bottom opening of the container and secured by a closure.

16 Claims, 6 Drawing Sheets

FIG 6
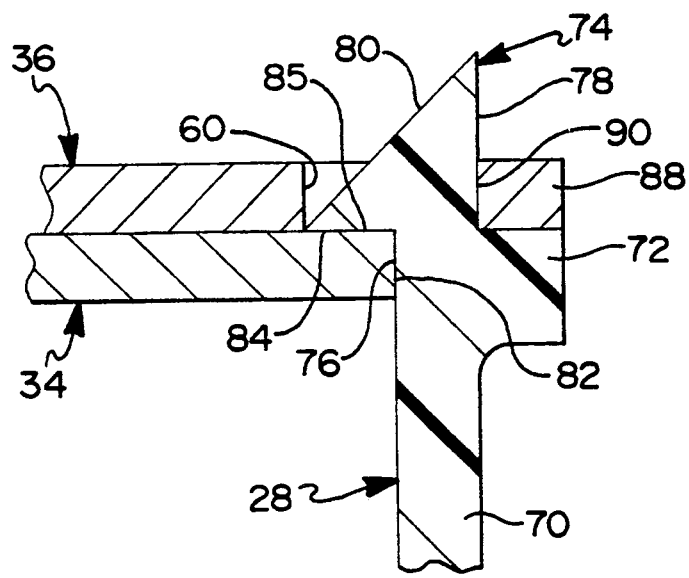
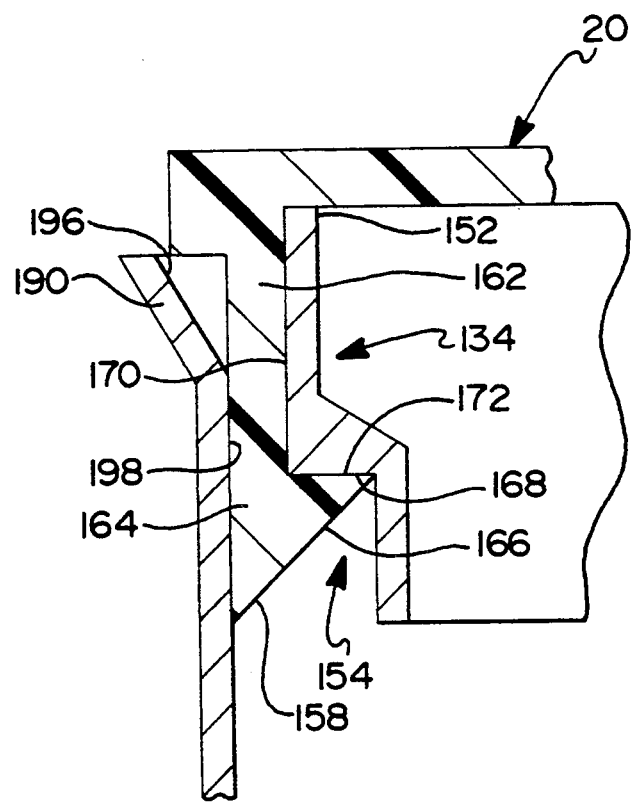
FIG 7

5,354,093

AIR BAG MODULE HAVING INTEGRAL COVER ATTACHMENT

BACKGROUND OF THE INVENTION

This invention relates generally to vehicle air bag installations and, more particularly, to an air bag module in which the module cover is attached to the inflator support without additional fasteners.

It is common to provide an air bag assembly in which an inflator is riveted to a container for the air bag. A cover is then attached to the container with additional rivets. With this arrangement, all elements in the assembly are assembled at one time. The assembled unit is then handled, stored and transported several times before installation in a passenger vehicle.

The inflator is the most expensive component of an air bag assembly. The probability of damage to the inflator is proportional to the amount of handling. It would be desirable to assemble all components in an air bag assembly, except the inflator, for subsequent handling as a unit. The inflator could then be installed at the last possible moment before vehicle installation of the assembly. This would reduce the probability of inflator damage. Also, any reduction in the number of rivets used also reduces assembly time and resultant cost.

It would be desirable to provide an air bag module in which the assembly cover is attached without additional rivets or other fasteners, but which secures the cover against subsequent removal during air bag deployment.

It would be desirable to provide an air bag module which permits the inflator to be assembled subsequent to assembly of the other components.

SUMMARY OF THE INVENTION

It is therefore an object of this invention to provide an air bag module in which the assembly cover is attached without additional rivets or other fasteners, but which secures the cover against subsequent removal during air bag deployment.

Another object of this invention is to provide an air bag module which permits the inflator to be assembled subsequent to assembly of the other components.

In one aspect, this invention features an air bag module comprising a support for an inflator, a cover for confining an air bag, and means for attaching the cover to the support. The attaching means comprise a plurality of latch surfaces mounted on the support, a plurality of latch hooks spaced about the periphery of the cover which engage the latch surfaces when the cover is assembled to the support, and locking means for thereafter preventing disengagement of the hooks from the latch surfaces to prevent separation of the cover from the support.

Preferably, the locking means include a locking plate having a locking tab located adjacent each latch hook upon assembly of the locking plate to the support which prevents deflection of the latch hooks. This maintains the latch hooks in engagement with the latch surfaces.

Preferably, the latch hooks are resilient and the support includes a latch shoulder adjacent each latch surface operable to force the latch hooks to deflect and snap over the latch shoulders and engage the latch surfaces during cover assembly.

In another aspect, this invention features an air bag module comprising an air bag, an inflator, a support mounting the air bag, a container mounting the inflator, a cover for confining an air bag for inflation by the inflator, and means for attaching the cover to the support. The attaching means include a plurality of indentations formed on the support each including adjacent latch shoulders and latch surfaces, and a plurality of resilient latch hooks spaced about the periphery of the cover which are deflected by the latch shoulders to snap into engagement with the latch surfaces when the cover is mated to the support. A top opening in the container receives the assembled air bag, support and cover. Locking means carried by the container adjacent the top opening thereafter prevent disengagement of the latch hooks from the latch surfaces to prevent separation of the cover from the support.

In yet another aspect, this invention features a method of assembling an air bag assembly which comprises the steps of
  providing an air bag,
  providing a container having a plurality of latch surfaces and adjacent latch shoulders,
  providing a cover having a plurality of latch hooks spaced about its periphery,
  placing the air bag within the container,
  assembling the cover to the container by snapping the latch hooks over the latch shoulders into engagement with the latch surfaces,
  providing a locking plate having a plurality of locking tabs, and
  securing the locking plate to the container with the locking tabs adjacent each latch hook to prevent deflection of the latch hooks and maintain the latch hooks in engagement with the latch surfaces.

Preferably, the method includes the step of securing the air bag, the inflator and the locking ring to the container with the same fasteners.

These and further objects and features of this invention will become more readily apparent upon reference to the following detailed description of a preferred embodiment, as illustrated in the accompanying drawings, in which:

BRIEF DESCRIPTION OF THE DRAWINGS

FIG. 6 is an enlarged sectional view of a portion of the driver side air bag module, illustrating the interconnection between the cover and the support plate;

FIG. 7 is an enlarged sectional view of a portion of the passenger side air bag module, illustrating the interconnection between the cover and the air bag container;

DETAILED DESCRIPTION OF A PREFERRED EMBODIMENT

Figure 1:
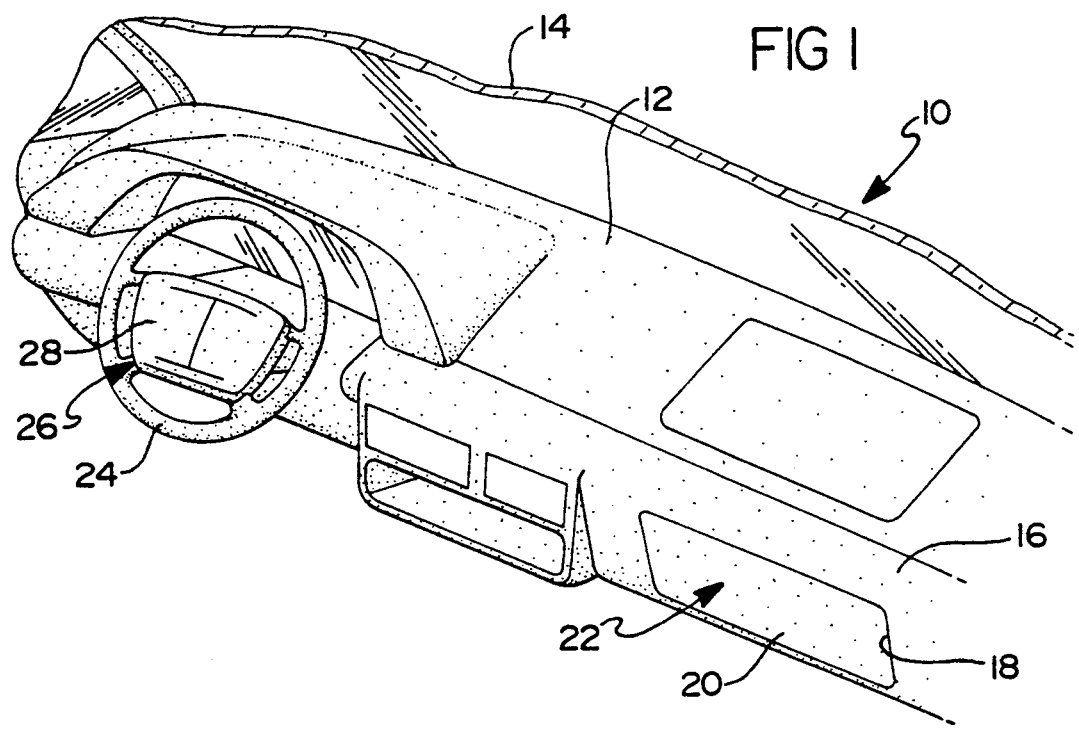
FIG. 1 is a partial perspective view of a vehicle interior, showing an instrument panel and steering wheel incorporating passenger side and driver side air bag modules according to this invention.
Figure 2:
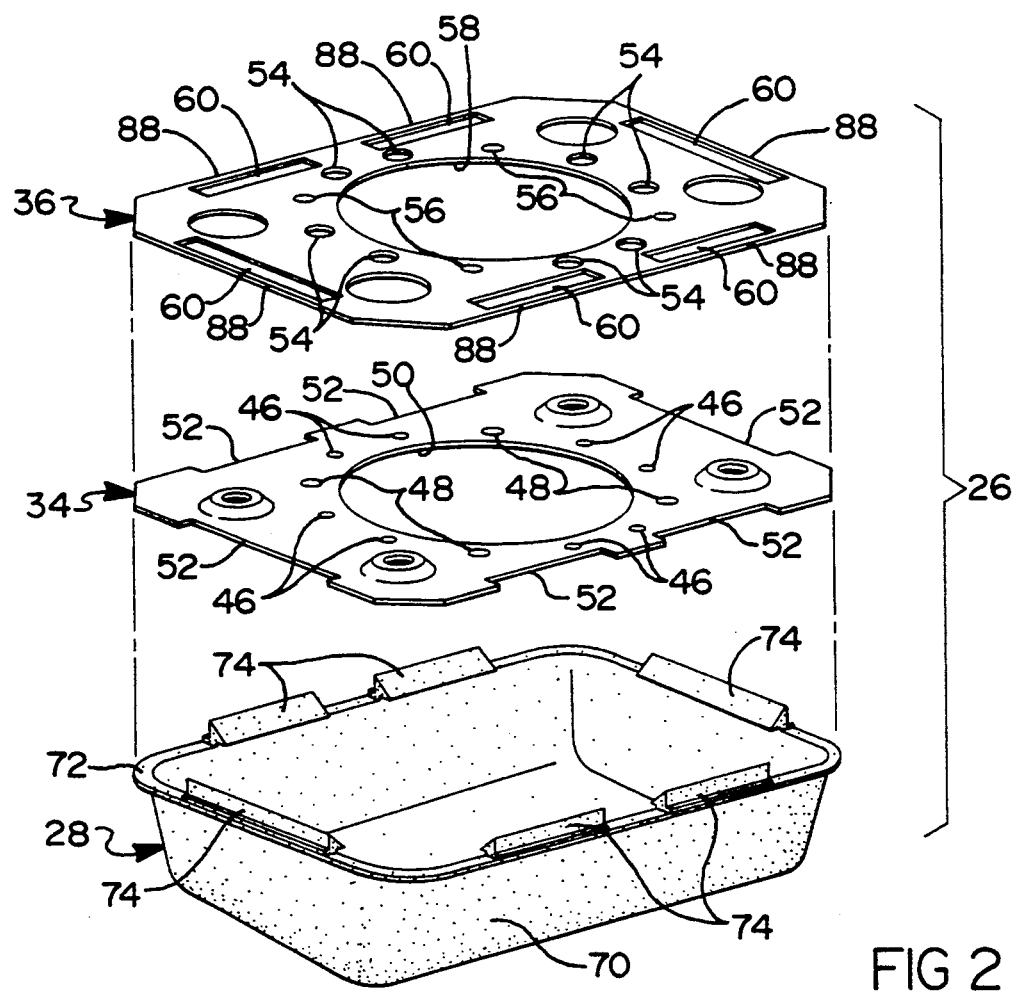
FIG. 2 is an exploded perspective view of the cover, support plate and locking plate of the driver side air bag module, according to this invention.

Referring to FIG. 1 of the drawings, a vehicle passenger compartment 10 mounts an instrument panel 12 adjacent a windshield 14. Instrument panel 12 has a rear surface 16 that includes an air bag deployment opening 18 on one side that is normally closed by a cover door 20 of a passenger side air bag module.

On the other side of passenger compartment 10, a steering wheel 24 extends from instrument panel 12. The hub of steering wheel 24 incorporates a driver side air bag module 26 having a cover.

As shown in FIGS. 2–5, driver side air bag module 26 comprises the polyurethane or other plastic resilient cover 28, an air bag 30 of conventional construction, a steel air bag retainer ring 32, a flat metallic support plate 34, a metallic locking plate 36, and a conventional inflator 38. Air bag 30 has four pairs of retention holes 40 and four spaced rivet holes 42 bounding a central inflation opening 43. Retainer ring 32 has four pairs of spring retention fingers 44, which align with hole pairs 40, and four spaced rivet holes (not shown) which align with holes 42.

Support plate 34 also has four spaced pairs of retention holes 46, which align with retention fingers 44, and four spaced rivet holes 48, which align with holes 42. Support plate 34 has a central opening 50 and six peripheral notches 52. Locking plate 36 is similarly configured, with four pairs of holes 54, larger than holes 46, four spaced rivet holes 56, aligned with holes 48, a central opening 58, and six spaced peripheral slots 60, which align with notches 52.

Inflator 38 includes a central hub 62 having circumferentially-spaced gas discharge holes 64. A mounting flange 66 extends from hub 62 and incorporates four spaced rivet holes 68 (only two shown) which align with rivet holes 42, 48 and 56.

Figure 3:
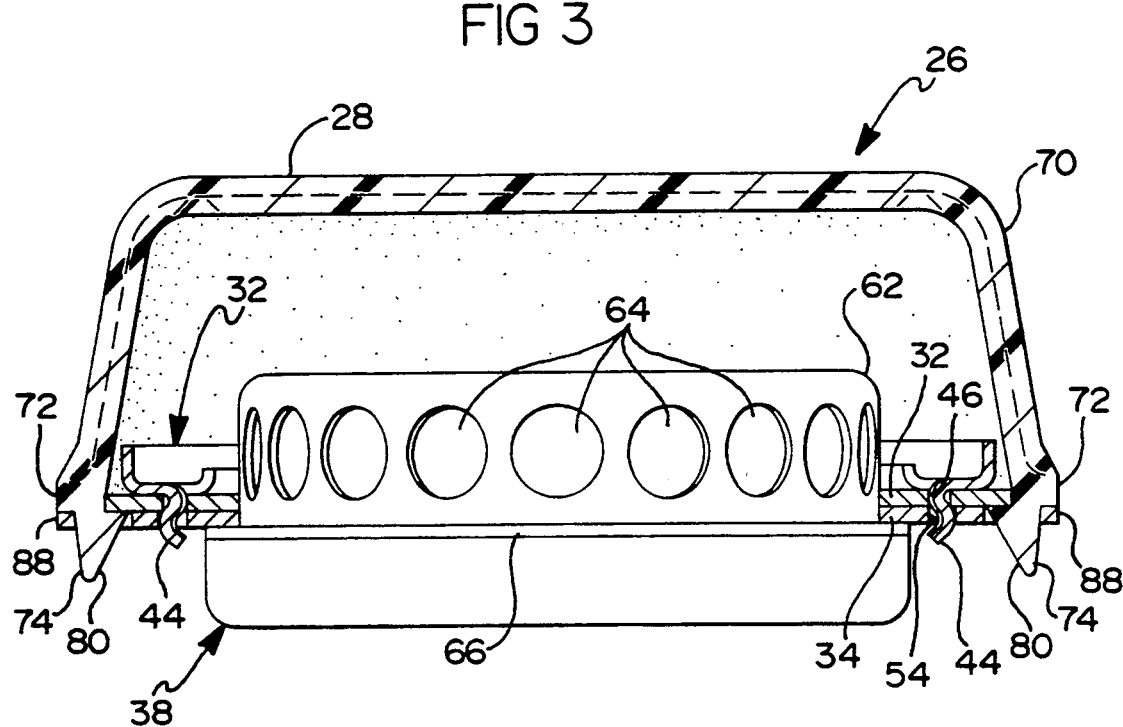
FIG. 3 is a sectional view of the assembled driver side air bag module, with the air bag removed for purposes of better illustration.
Figure 4:
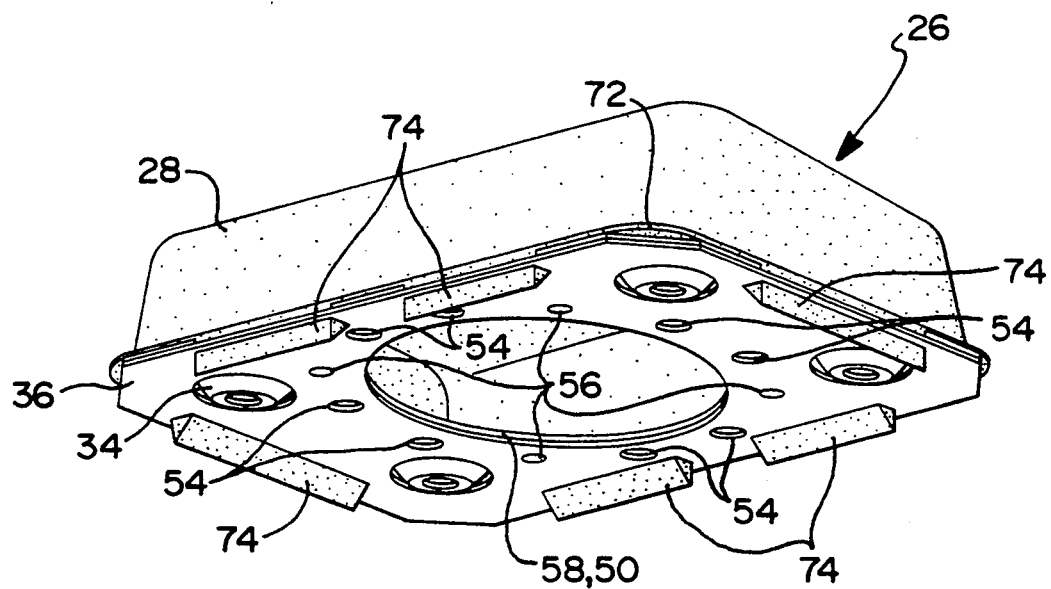
FIG. 4 is a perspective view of the air bag module of FIG. 3.
Figure 5:
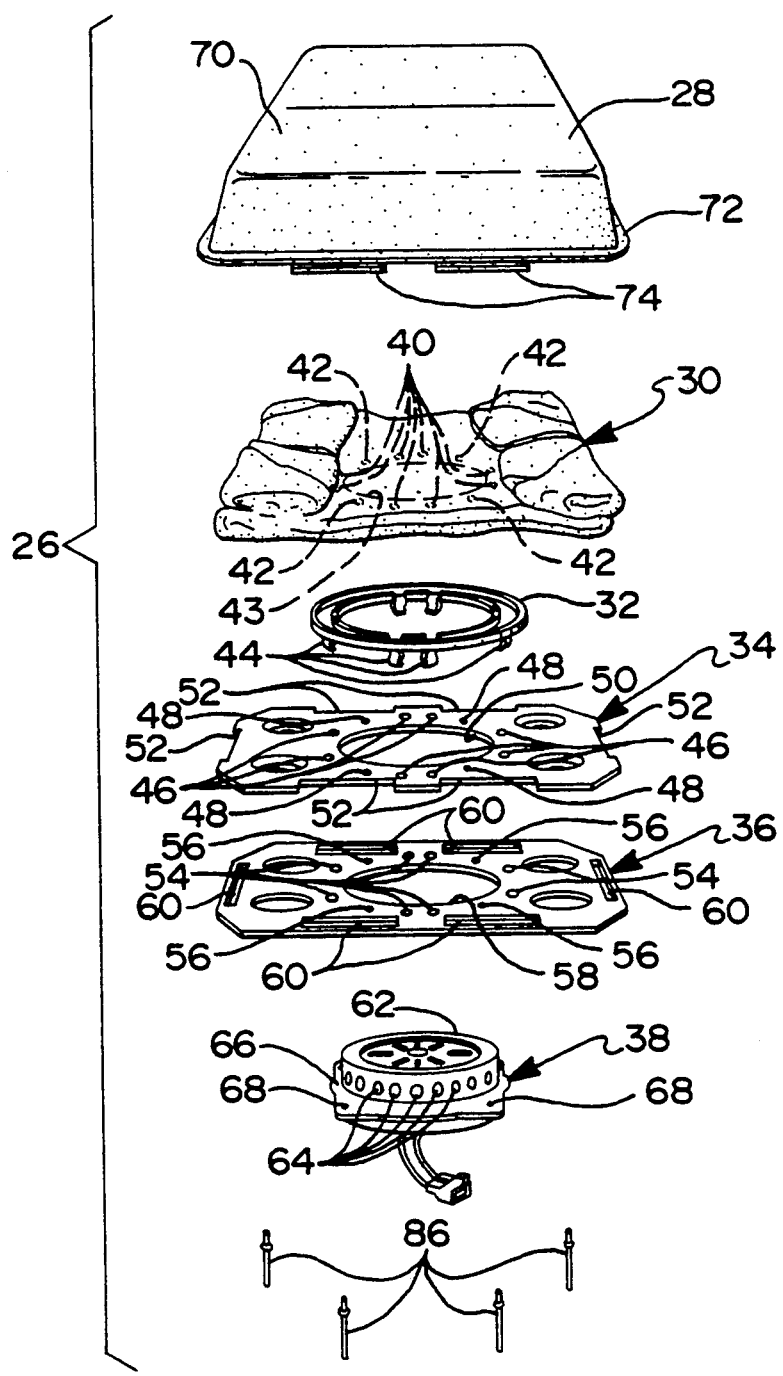
FIG. 5 is an exploded perspective view of the driver side air bag module showing all component parts.

As best seen in FIGS. 3 and 6, cover 28 comprises a domed body 70 bounded by a peripheral flange 72. Six integral resilient latch hooks 74, which align with notches 52 and slots 60, project from flange 72 and each comprise a shank 76, which supports an enlarged head 78 having a cam surface 80. Air bag module 26 is assembled as follows. Ring 32 is inserted through air bag opening 43 and spring fingers 44 are inserted back out through holes 40. Support plate 34 is assembled to ring 32 and air bag 30 by projecting spring fingers through holes 46 so that fingers grip the sides of holes 46, as shown in FIG. 3, to retain this subassembly together. Air bag 30 is then folded.

Heads 78 of cover latch hooks 74 normally project inwardly further than the latch shoulders which form the outside edges 82 of notches 52. Cover 28 is next pressed onto support plate 34. This action engages latch hook cam surfaces 80 with latch shoulder portions 82 of notches 52 and deflects resilient latch hooks 74 outwardly until heads 78 snap latch over latch shoulders 82. This assembles cover 28 to support plate 34, with latch hook shanks 76 engaging latch shoulders 82 and the edge 84 of heads 78 engaging latch surfaces 85 adjacent notches 52.

Latch hooks 74 hold this assembly of cover 28, air bag 30 and support plate 34 together for subsequent handling. Since the domed body 70 of cover 28 now confines the folded air bag 30, this assembly of components can be handled without damaging the air bag. Any mishandling of this assembly will not harm the expensive inflator, since it has not yet been assembled.

Cover 28 contains internal weakened sections (not illustrated) which will rupture when subjected to the force of the inflating air bag, forming doors that will be forced open to enable air bag deployment in a well-known manner. Although cover 28 is assembled to support plate 34, resilient latch hooks 74 are not confined and may deflect outwardly to release cover 28 when it is subjected to the force of air bag inflation. Thus, to assure retention of cover 28 during subsequent inflation of air bag 30, locking plate 36 is provided, as later described.

When it is desired to complete air bag module 26 for vehicle installation, locking plate 36 is placed on support plate 34, with slots 60 overlying latch hook heads 78. Inflator 38 is added, with hub 62 inserted through openings 58, 50 and 43. Rivets 86 are then inserted through aligned rivet holes 68, 56, 48, 42 and the rivet holes in retainer ring 32 and upset to secure the components together and complete air bag module.

Cover 28 is now secured to support plate 34 by locking plate 36, as shown in FIGS. 3 and 6. Slots 60 of locking plate 36 are bounded by the outer edges of plate 36, which form locking tabs 88 that abut the adjacent outside surfaces 90 of latch hook heads 78. This confines and prevents any deflection of latch hooks 74 to maintain them in engagement with support plate latch surfaces 85. In this manner, locking plate 36 locks cover 28 to support plate 34 and prevents cover separation during subsequent inflation and deployment of air bag 30 by inflator 38.

Figure 8:
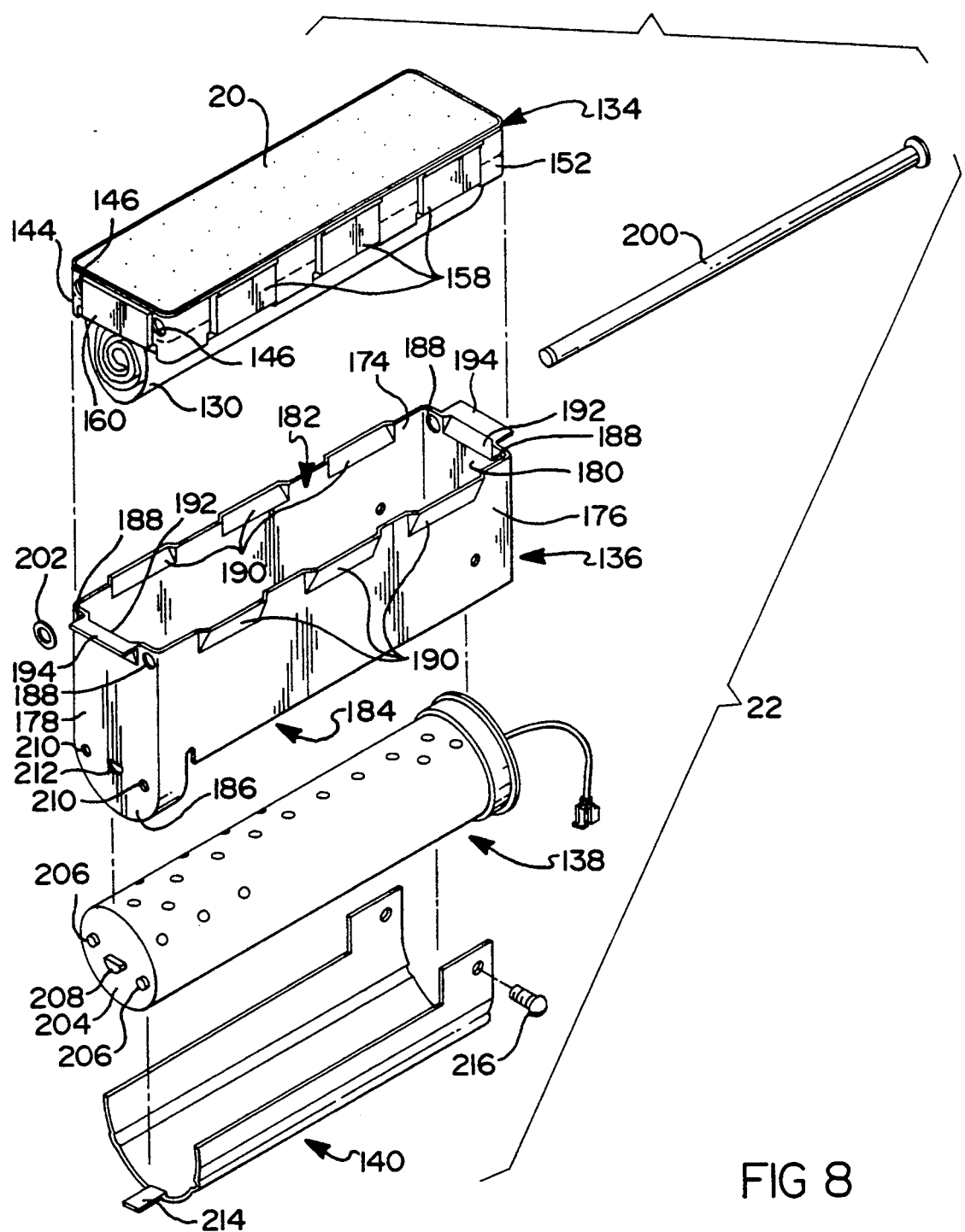
FIG. 8 is an exploded perspective view of the passenger side air bag module.
Figure 9:
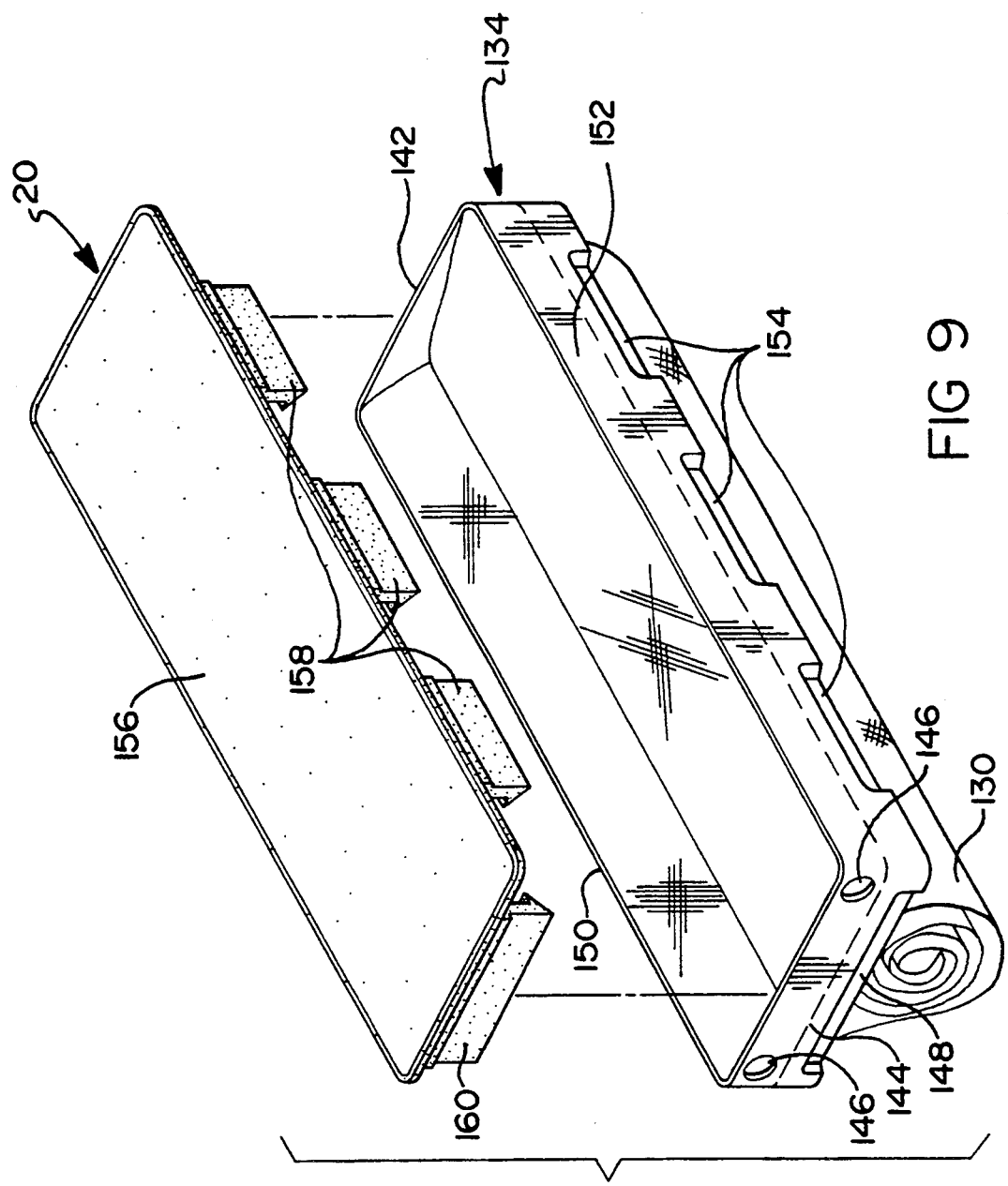
FIG. 9 is an exploded perspective view of the cover, container and air bag of the passenger side air bag module.

The passenger side air bag module 22 is shown in FIGS. 7, 8 and 9. Module 22 comprises polyurethane or other resilient plastic cover 20, an air bag 130 of conventional construction, a steel air bag support or retainer 134, a steel container 136, a conventional inflator 138 and a steel inflator bottom closure 140. Air bag retainer 134 is a short rectangular structure comprising end walls 142 and 144, which are substantially identical; each have two spaced holes 146 (only two shown), which are aligned, and a bottom indentation or notch 148 (only one shown). Side walls 150 and 152 complete retainer 134 and are substantially identical, each having three spaced bottom indentations or notches 154. Together, walls 142, 144, 150 and 152 define an open top and bottom structure. Air bag 130 is attached to retainer 134 by sewing or other conventional manner.

Cover 20 comprises a rectangular top 156 which is formed on its underside (not illustrated) to contain weakened sections which will rupture when subjected to the force of the inflating air bag, forming doors that will be forced open to enable air bag deployment in a well-known manner. Depending from top 156 are three spaced latch hooks 158 on each side (only one side shown), which align with retainer indentations 154, and a latch hook 160 on each end (only one shown), which align with retainer indentations 148).

All latch hooks 158 and 160 have an identical construction. Thus, while only latch hooks 158 will be described with particular reference to FIG. 7, this description applies equally to latch hooks 160. Latch hook 158 comprises a shank 162 which supports an enlarged head 164 having a cam surface 166.

Retainer indentations 148 and 154 are also identical, except in location. Thus, while indentations 154 will be described with reference to FIG. 7, this description applies equally to indentations 148. Each indentation 154 comprises a latch surface 168 which extends inwardly from an adjacent portion of side 152 forming a latch shoulder 170.

In assembling air bag module 22, air bag 130 is attached to retainer 134 and cover 20 is then assembled to retainer 134. Heads 164 of cover latch hooks 158, 160 normally project inwardly further than the side walls 150, 152 and end walls 142, 144. Cover 20 is next pressed onto retainer 134. This action engages latch hook cam surfaces 158 with latch shoulder portions 170 of side walls 150, 152 and end walls 142, 144 and deflects resilient latch hooks 158, 160 outwardly until heads 164 snap latch over latch shoulders 170. This assembles cover 20 to retainer 134, as illustrated in FIG. 8, with latch hook shanks 162 engaging latch shoulders 170 and the edge 172 of heads 164 engaging latch surfaces 168 adjacent notches 148, 154.

As with driver side cover 28 cover 20 is assembled to retainer 134, resilient latch hooks 158, 160 are not confined against outward deflection and release cover 20 when it is subjected to the force of air bag inflation. Thus, the top of container 136 is configured to assure retention of cover 20 during subsequent inflation of air bag 130.

Container 136 is a generally rectangular structure, comprising side walls 174, 176 and end walls 178, 180 which define a top opening 182 and a bottom opening 184. End wall 178 includes a depending part-cylindrical section for supporting one end of inflator 138, as later described.

End walls 178, 180 include spaced holes 188, which align with holes 146 in the end walls 142, 144 of retainer 134. Side walls 174, 176 each contain three spaced identical outward tapered protrusions 190, which align with cover latch hooks 158. End walls 178, 180 each contain an outward tapered protrusion 192 which terminates in a mounting flange 194. Protrusions 192 are identical to protrusions 190, except for location. Thus, while protrusions 190 will be described with reference to FIG. 7, this description applies equally to protrusions 192. Each protrusion 190, 192 includes a throat 196 which tapers inwardly to a vertical locking tab portion 198 on the insides of walls 174, 176, 178 and 180.

The outside dimension of the assembled retainer 134 and cover 20 is substantially the same as the inside dimension of container top opening 182. The assembled retainer 134 and cover 20 are inserted into top opening 182. Because there is no assurance that all latch hooks 158, 160 tightly embrace the side and end walls of retainer 134 and because of the tight fit, attempted assembly of retainer 134 and cover 20 to container 136 could snag one or more latch hooks on the walls of container 136 and frustrate assembly.

To prevent such assembly problems, protrusions 190, 192 are provided. During assembly, protrusion throats 196 guide latch hook heads 164 into confinement between latch shoulders 170 and locking tab portions 198 of the container walls. This both facilitates assembly and assures that cover 20 is retained in position during subsequent air bag inflation and deployment through cover 20 by preventing any lateral deflection of latch hooks 158, 160.

As assembled, retainer holes 146 and container holes 188 are aligned. Headed mounting rods 200 (only one illustrated) can now be inserted through the aligned holes in one end, through the assembly and out the holes in the other end, where retaining clips 202 are applied to secure retainer 134 to container 136.

Cover 20, air bag 130, retainer 134 and container 136 are now assembled together as a unit for subsequent handling. Since the folded air bag 130 is now confined, this assembly of components can be handled without damaging the air bag. Any mishandling of this assembly will not harm the expensive inflator, since it has not yet been assembled.

When it is desired to complete air bag module 22 for vehicle installation, inflator 138 is inserted through bottom opening 184. Inflator end 204 contains locating studs 206 and an orientation lug 208 which are inserted into mating holes 210 and 212 in container part-cylindrical section 186. Inflator confinement is completed by assembling bottom closure 140 to container 136 by tab 214 and screws 216 (only one illustrated). Passenger side air bag module 22 is now ready for vehicle installation.

Each of the air bag modules described above provides for attachment and securing of module cover without additional rivets or other fasteners. Both also permit the inflator to be assembled subsequent to assembly of the other components.

While only two preferred embodiments have been illustrated and described, obvious modifications thereof are contemplated within the scope of this invention and the following claims.

We claim:

1. An air bag module comprising a support plate for an inflator, a cover for confining an air bag, and means for attaching the cover to the support, comprising
   a plurality of latch surfaces mounted on the support,
   a plurality of resilient latch hooks spaced about the periphery of the cover which engage the latch surfaces when the cover is assembled to the support,
   a plurality of latch shoulders on the support plate adjacent each latch surface which force the latch hooks to deflect and snap over the latch shoulders and engage the latch surfaces when the cover is assembled to the support plate,
   a slot adjacent each latch shoulder on the support plate which enables the latch hooks to pass through the plate into engagement with the latch shoulders, and
   locking means for thereafter preventing disengagement of the hooks from the latch surfaces to prevent separation of the cover from the support.

2. The air bag module of claim 1, wherein the locking means include a locking plate having a locking tab located adjacent each latch hook upon assembly of the locking plate to the support plate which prevents deflection of the latch hooks, thereby maintaining the latch hooks in engagement with the latch surfaces.

3. The air bag module of claim 1, wherein each latch hook includes a head which engages the latch surface, and a shank which embraces the latch shoulder and connects the head to the cover.

4. The air bag module of claim 2, wherein each latch hook head has a cam surface engageable with a latch shoulder to force the head to deflect and snap over the latch shoulders.

5. The air bag module of claim 4, wherein the locking means include a locking plate having a locking tab located adjacent each latch hook upon assembly of the locking plate to the support which prevents deflection of the latch hooks, thereby maintaining the latch hooks in engagement with the latch surfaces to prevent separation of the cover from the support.

6. The air bag module of claim 1, wherein the locking means comprise locking plate which is substantially coextensive with the support plate and includes a plurality of slots which embrace the latch hook heads, and including a plurality of fasteners for securing the air bag, container, locking plate and inflator together.

7. The air bag module of claim 1, wherein the support plate comprises an air bag retainer including the latch shoulders and latch surfaces and a mating container mounting the inflator and incorporating the locking means which prevent disengagement of the hooks from the latch surfaces when the bag retainer and the container are mated.

8. The air bag module of claim 7, wherein the air bag retainer comprises side and end walls defining an open top and open bottom rectangular housing, the walls comprising the latch shoulders and having peripheral indentations spaced about their bottom edges forming the latch surfaces.

9. The air bag module of claim 8, wherein the latch hooks include heads which engage the latch surfaces and shanks which embrace the latch shoulders and connect the heads to the cover.

10. The air bag module of claim 9, wherein the container has side and end walls which define a top opening receiving the air bag retainer within and which engage the latch hook shanks to prevent disengagement of the hooks from the latch surfaces when the bag retainer and the container are mated.

11. An air bag module comprising an air bag, an inflator, a support mounting the air bag, a container mounting the inflator, a cover for confining an air bag for inflation by the inflator, and means for attaching the cover to the support comprising
    a plurality of indentations formed on the support each including adjacent latch shoulders and latch surfaces,
    a plurality of resilient latch hooks spaced about the periphery of the cover which are deflected by the latch shoulders to snap into engagement with the latch surfaces when the cover is mated to the support.
    a top opening in the container for receiving the assembled air bag, support and cover, and
    locking means carried by the container adjacent the top opening for thereafter preventing disengagement of the latch hooks from the latch surfaces to separation of the cover from the support.

12. The air bag module of claim 11, wherein the latch hooks are resilient and the support includes a latch shoulder adjacent each latch surface operable to force the latch hooks to deflect and snap over the latch shoulders and engage the latch surfaces during cover assembly.

13. The air bag module of claim 12, wherein the locking means include a plurality of locking tabs spaced about the top opening and a plurality of camming flanges which guide the latch hooks into engagement with the locking tabs upon assembly of the container to the support to prevent deflection of the latch hooks, thereby maintaining the latch hooks in engagement with the latch surfaces to prevent separation of the cover from the support.

14. The air bag module of claim 13, wherein the container includes a bottom opening for receiving the inflator and a bottom closure for confining the inflator in the container.

15. A method of assembling an air bag assembly comprising the steps of
    providing an air bag,
    providing a container having a plurality of latch surfaces and adjacent latch shoulders,
    providing a cover having a plurality of latch hooks spaced about its periphery,
    placing the air bag within the container,
    assembling the cover to the container by snapping the latch hooks over the latch shoulders into engagement with the latch surfaces,
    providing a locking plate having a plurality of locking tabs,
    securing the locking plate to the container with fasteners, with the locking tabs adjacent each latch hook to prevent deflection of the latch hooks and maintain the latch hooks in engagement with the latch surfaces, and
    securing the inflator to the container with the same fasteners used to secure the locking plate to the container 16. The method of claim 15, including the step of
    securing the air bag to the container with the same fasteners used to secure the inflator and the locking plate to the container.

* * * * *